United States Patent [19]

Shiraishi

[11] 4,139,874
[45] Feb. 13, 1979

[54] MAGNETIC DISC RECORDING AND/OR REPRODUCING APPARATUS WITH MEANS TO DAMP AND LOCK DISK ROTATION

[75] Inventor: Fumitake Shiraishi, Hamura, Japan

[73] Assignee: Tokyo Shibaura Electric Co., Ltd., Kawasaki, Japan

[21] Appl. No.: 835,953

[22] Filed: Sep. 23, 1977

[30] Foreign Application Priority Data

Sep. 24, 1976 [JP] Japan .................. 51-128278

[51] Int. Cl.² .................. G11B 17/00; G11B 21/08; G11B 25/04
[52] U.S. Cl. .................. 360/86; 360/75; 360/105
[58] Field of Search .................. 360/86, 97-99, 360/105, 106, 107, 135, 75

[56] References Cited

U.S. PATENT DOCUMENTS

| | | | |
|---|---|---|---|
| 3,050,585 | 8/1962 | Zimmermann | 360/78 |
| 3,518,651 | 6/1970 | Keeney | 360/75 |
| 3,710,357 | 1/1973 | Buslik | 360/97 |
| 3,896,491 | 7/1975 | Soehring et al. | 360/107 |
| 3,922,717 | 11/1975 | Zimmermann | 360/86 |

FOREIGN PATENT DOCUMENTS 1342495  1/1974  United Kingdom .................. 360/86

*Primary Examiner*—Alfred H. Eddleman
*Attorney, Agent, or Firm*—Oblon, Fisher, Spivak, McClelland & Maier

[57] ABSTRACT

The apparatus of this invention has an electric motor assembled integrally with a motor brake for rotating a magnetic disc, a rocking arm fitted at its tip end with a magnetic head, and a rotary solenoid to shift the magnetic head by getting engaged with the rocking arm, energized by a spring so as to rock in one direction, and is so constructed as to stop and lock the electric motor and the magnetic disc by operation of the motor brake, when power is cut off, and to turn the rocking arm until the rocking portion of the rotary solenoid is rotated in said one direction by the force of the spring to shift and lock the magnetic head to a landing zone defined within the magnetic disc, thus preventing the magnetic head and the magnetic disc from rubbing or running against each other when the power is cut off.

7 Claims, 5 Drawing Figures

MAGNETIC DISC RECORDING AND/OR REPRODUCING APPARATUS WITH MEANS TO DAMP AND LOCK DISK ROTATION

BACKGROUND OF THE INVENTION

This invention relates to a magnetic disc recording and/or reproducing apparatus comprising a body of revolution including a flange and a magnetic disc attached to such flange and capable of rotation, a revolution controlling mechanism to rotate such body of revolution, a rocking arm fitted at its tip end with at least one magnetic head and capable of rocking so as to allow the magnetic head to shift along the magnetic disc, and an actuator for driving such rocking arm.

Generally, in this type of magnetic disc recording and/or reproducing apparatus, the magnetic head is stopped in a damped state on a holding zone or landing zone previously defined in the magnetic memory medium (hereinafter referred to simply as the disc) when power is applied, while, when there is inputted a command for shifting the magnetic head, the magnetic head is driven by the actuator to shift floatingly on to a specified data track and kept in a floating state as it is, thus recording and/or reproducing data at the disc.

In the conventional magnetic disc recording and/or reproducing apparatuses, however, if the power is cut off due to power failure, interruption of service, conveyance for shifting location of the apparatus, etc., the operation of the actuator will be stopped and the magnetic head, brought in a free state, will find it difficult to be held securely on the landing zone. Consequently, when any vibration or impact is applied to the apparatus, the magnetic head may move vibratorily or impactively or shift its position substantially while kept in contact with the data track formed on the disc. Therefore, both of the magnetic head and disc may be damaged to shorten the life of the apparatus, or the data stored in the disc may be ruined (over a wide range, on occasion) to allow no security of such stored data.

SUMMARY OF THE INVENTION

An object of this invention is to provide a magnetic disc recording and/or reproducing apparatus free from the above defects peculiar to the conventional apparatuses and capable of shifting and locking the magnetic head automatically on to the landing zone as well as of automatically damping rotation of the disc and locking thereof when the power for the apparatus is cut off, that is, when the apparatus is nonconducting.

In order to attain the above object, the revolution controlling device of the magnetic disc recording and/or reproducing apparatus according to the invention is provided with a means for damping the rotation of and locking the disc when the apparatus is in the nonconducting state and an arm lock mechanism for turning the rocking arm, when nonconducting, to shift the magnetic head on to a landing zone defined in the disc as well as to thrust the rocking arm as it is against a stopper provided within a carriage housing, thereby locking the rocking arm and hence the magnetic head.

In thus constructed magnetic disc recording and/or reproducing apparatus, both the magnetic head and disc are kept in a locked position when nonconducting, so that they will neither be damaged nor miss the stored data even if vibration or impact is applied to the apparatus.

In a preferred embodiment of the invention, the revolution controlling mechanism includes an electric motor for rotating a body of revolution and a motor brake direct-coupled to and formed integrally with the electric motor for damping the rotation of and locking such motor when the apparatus is in the nonconducting state. In this case, the electric motor and the motor brake are assembled integrally, thereby contributing to miniaturization of the apparatus as a whole.

In another preferred embodiment, the arm lock mechanism includes a means for thrusting the rocking arm to turn thereof, e.g., a projection extending from the rocking arm, and a locking solenoid for driving such means. Such locking solenoid may be either rotary or linear solenoid. In this case, the rocking arm may be locked with a simple mechanism by using as the locking solenoid one with a built-in spring for energizing the moving portion thereof in a fixed direction and turning the rocking arm by means of the movement of such moving portion urged by such spring when the apparatus is nonconducting.

DETAILED DESCRIPTION OF THE PREFERRED EMBODIMENTS

Figure 1:
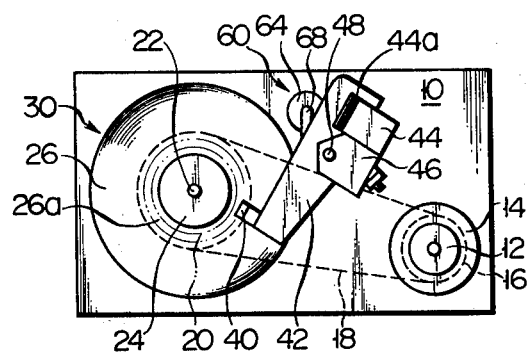
FIG. 1 is a plan of the magnetic disc recording and/or reproducing apparatus of this invention showing an embodiment.

FIG. 1 is a plan of the magnetic disc recording and/or reproducing apparatus of the invention cleared of the protective cover which is usually set up for covering the upper portion of the apparatus. An electric motor 14 direct to and assembled integrally with a conventional motor brake 12 on a base 10 drives a shaft 22 through a pulley 16, a belt 18, and a pulley 20. The motor brake 12, electric motor 14, pulley 16, belt 18, pulley 20, and shaft 22 form a revolution controlling mechanism 30 for rotating a body of revolution 28 composed of a flange 24 attached to the shaft 22 and a disc 26 attached to such flange 24. A ring-shaped portion 26a defined along the inner periphery of the disc 26 is used as a landing zone as mentioned hereinafter.

A magnetic head 40 is attached to the tip end of a rocking arm 42, which is turned around a shaft 48 by an actuator 44 to operate with a control signal applied to an exciting coil 44a as well as by a carriage housing 46. The magnetic head 40 moves substantially radially according to the rocking motion of the rocking arm 42 and is shifted to a desired track position.

While this apparatus is conducting, that is, the apparatus is supplied with power or is in the power-on state, the electric motor 14 rotates the disc 26 freely without operation of the motor brake 12. When the power is cut off and the apparatus is deenergized, the motor brake 12 damps and stops the electric motor 14 and then locks it as it is. Therefore, when the apparatus is in the nonconducting state, that is, the apparatus is not supplied with power, or is in the power-off state, the disc 26 is also locked and prevented from rotating freely.

Numeral 60 denotes an arm lock device for forcing the rocking arm 42 to rock, when the apparatus is deenergized, and thereby shifting and locking the magnetic head 40 on to the landing zone 26a.

Figure 2:
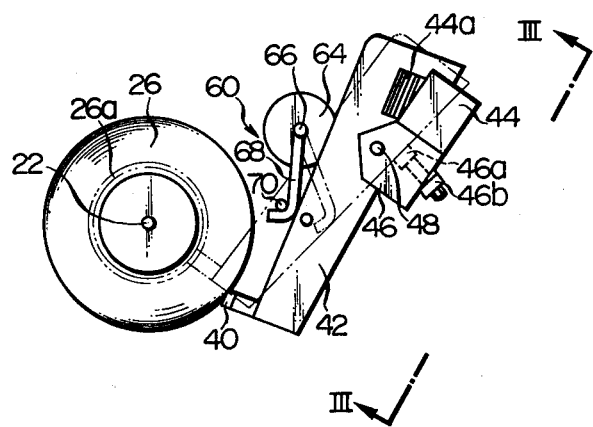
FIG. 2 is an illustrative diagram showing an example of the operation of the arm lock mechanism of the apparatus of FIG. 1.
Figure 3:
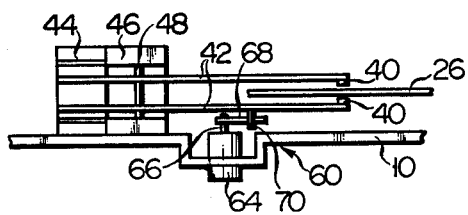
FIG. 3 is a side view as taken along line III—III of FIG. 2.

As shown in FIGS. 1, 2 and 3, the arm lock device 60 is composed of a rotary solenoid 64 or a locking solenoid to turn the rocking arm 42, an operating arm 68, and a pin 70. The rotary solenoid 64 is attached to the base 10, while the operating arm 68 fixed to a shaft 66 is energized clockwise by a spring (not shown) incorporated in the rotary solenoid 64. The pin 70, set up on the rocking arm 42, is a projection used as a means for thrusting the rocking arm 42 to turn it.

When this apparatus is energized, the operating arm 68 is fully turned counterclockwise as in FIGS. 1 and 2 against the force of the built-in spring by the action of the rotary solenoid 64, never preventing the ordinary operation of the rocking arm 42 driven by the actuator 44 supported by the carriage housing 46. When the apparatus is deenergized, however, excitation of the rotary solenoid 64 is stopped, and the operating arm 68 is turned clockwise by the force of the built-in spring to get engaged at the tip end thereof with the pin 70 and push such pin 70 substantially to the left as in FIG. 2, thereby turning the rocking arm 42 clockwise. When the operating arm 68 is fully turned clockwise, it takes the position as indicated by alternate long and two short dashes line in FIG. 2, while the magnetic head 40 is shifted to a position above the landing zone 26a of the disc 26 and landed on such landing zone 26a as the rotation of the disc is reduced. In doing this, the rocking arm 42 is thrusted against a stopper 46a provided within the carriage housing 46 by the spring incorporated in the rotary solenoid 64, so that the magnetic head 40 is locked on the landing zone 26a, causing no rubbing or impactive relative movement between such magnetic head and the disc, as mentioned hereinbefore. The stopper 46a, screwed into the carriage housing 46, may be adjusted longitudinally by means of a nut 46b.

After the apparatus is deenergized, the magnetic head 40 is moved to the position over the landing zone 26a along the surface of the disc 26, though such movement is achieved in a floating state with a thin air stream formed between the magnetic head and the disc rotating by intertia while being damped. Accordingly, such movement will lead to neither damage to the magnetic head 40 or the disc 26 nor ruin of stored data. The magnetic head 40 may not be landed on the landing zone 26a until the rotation of the disc 26 is reduced to the fullest measure.

When the apparatus is energized again, the rotary solenoid 64 operates to turn the operating arm 68 counter-clockwise, and the rocking arm 42 and the magnetic head 40 are allowed to move freely to a desired track position on the disc, driven by the actuator 44.

The construction of the arm lock mechanism may be made clearer by referring to FIG. 2 in combination with FIG. 3, a view as taken along line III—III of FIG. 2.

Figure 4:
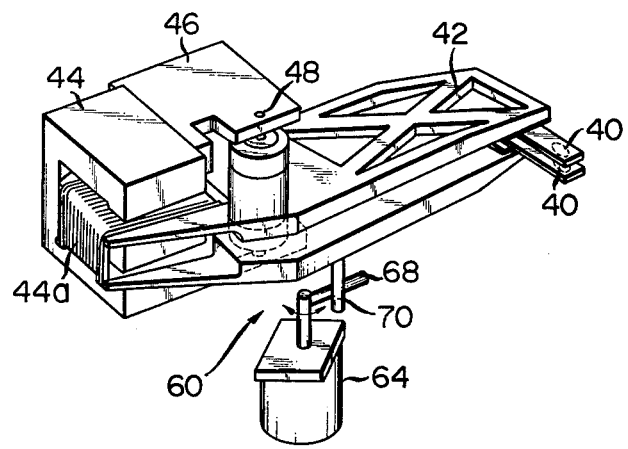
FIG. 4 is a perspective view of the arm lock mechanism with a rotary solenoid showing the state of coupling between the rocking arm and the rotary solenoid.

FIG. 4 shows the arm lock mechanism 60 employing the rotary solenoid 64, illustrating the relative assembled positions of the rocking arm 42, magnetic head 40, actuator 44, and carriage housing 46. These numerals are used in common with the case of FIGS. 1 to 3.

Although, in the above-mentioned embodiment, the operating arm 68 is turned by rocking the rotary solenoid 64, thereby driving the pin 70 to turn the rocking arm 42, the side face of the arm 42 may be pushed directly without using the pin 70. Further, as the rotary solenoid 64, there may be selected conventional one with a return spring contained therein and an operating range at a fixed angle, such as 30°, 60°, 90°, etc., no special solenoid required for use.

Figure 5:
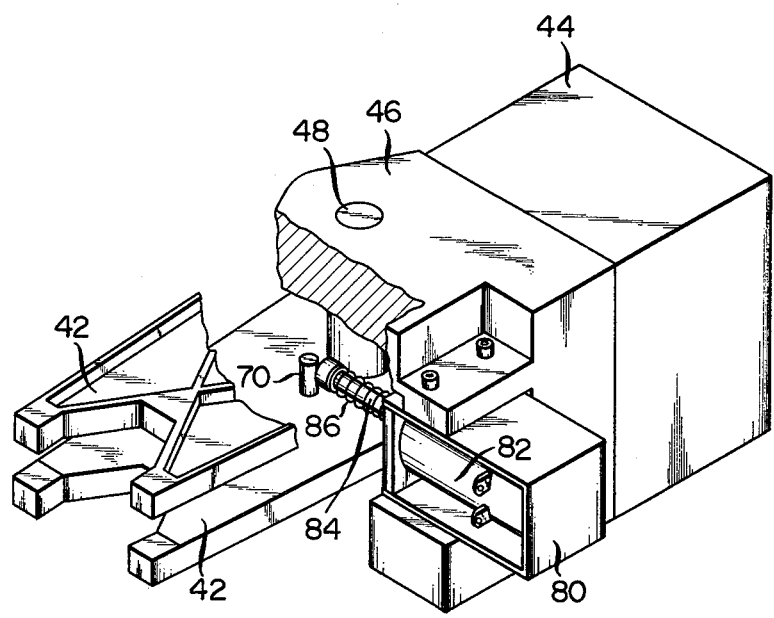
FIG. 5 is partially sectional perspective view of the arm lock mechanism with a linear solenoid for driving the rocking arm showing the state of coupling between the linear solenoid and the rocking arm.

FIG. 5 shows an alternative embodiment in which a linear solenoid 80 is used in liue of the rotary solenoid 64 of FIG. 4. Those numerals used in FIGS. 1 to 4 are also employed for FIG. 5 as they are. In FIG. 5, however, the magnetic head 40 is removed from the tip end of the rocking arm 42. When an exciting coil 82 is energized to drive the linear solenoid 80, a plunger 84 is sucked into the solenoid 80 against a coil spring 86 to break away completely from the pin 70 set up on the rocking arm 42. Therefore, the rocking arm 42 is controlled freely by the actuator 44 and the carriage housing 46 and turned to the desired position. When the exciting coil 82 is deenergized, the plunger 84 is drawn out from the solenoid 80 by action of the coil spring 86 and the tip end of the plunger 84 pushes the pin 70 to turn the arm 28 clockwise, as viewed from above in FIG. 5, around the shaft 48, thus allowing the rocking arm 42 to be shifted and locked to the landing zone 26a in the same manner as in FIG. 2. Like the case of FIG. 4, the pin 70 can be omitted by constructing the mechanism so that the side face of the arm 42 may be pushed directly instead of thrusting the pin 70 by means of the plunger 84.

Now I will describe the operation of the magnetic disc recording and/or reproducing apparatus of the invention from first to last. When power is applied to the apparatus, the motor brake 12 is energized, the electric motor 14 is released from the damped state, and the disc 26 is allowed to rotate freely. Accompanying the action of the motor brake 12, the rocking arm 42 is released from the locked position held by the rotary solenoid 60 (FIGS. 1 to 4) or linear solenoid 80 (FIG. 5), and the actuator 44 (rotary actuator in this case) operates according to the control signal transmitted from a controlling device (not shown) to shift the magnetic head 40 to the desired position, thereby performing recording and/or reproducing operation.

Meanwhile, the moment the power is cut off due to power failure, interruption of service, transfer of the apparatus, etc., the motor brake 12 and the locking solenoid, i.e., rotary solenoid 64 or linear solenoid 80, are deenergized. Accordingly, the motor brake 12 and the solenoid 64 or 80 are brought into the nonconducting state and the motor 14 is damped and finally locked, while the rocking arm 42 is forced to move to the position defined by the alternate long and two short dashes line in FIG. 2 and the magnetic head 40 is locked while resting on the landing zone 26a of the disc 26, as described hereinbefore. Thus, as the magnetic head 40 is locked, it may be held securely on the landing zone 26a and the disc 26 is locked so as not to rotate despite any external vibration or impact applied when the power is off, so that there is no possibility of damage to the magnetic head 40 and the disc 26 as well as of ruin of the stored data. Thereafter, when the power is applied again, the locking of the motor 14 by the motor brake 12 is released to allow the motor 14 to rotate, the rocking arm 42 and hence the magnetic head 40 are released from the locked position by a counterclockwise rotation of the rotary solenoid 64, and the magnetic head 40 is so controlled as to shift to the specified position, thus performing the recording and/or reproducing operation.

Although, in the above embodiment, the motor brake 12 is used for damping the motor 14 when the power is off, there may be provided, instead of such motor brake 12, a braking mechanism capable of damping, e.g., the disc 26 and flange 24 or the shaft 22.

As described above in detail, according to this invention, there may be obtained magnetic disc recording and/or reproducing apparatuses capable of securely preventing damage to the magnetic head 40 and the disc 26 when the power is off as well as of keeping highly reliable stored data.

What is claimed is:

1. A magnetic disc recording and/or reproducing apparatus comprising a body of revolution including a flange and a magnetic disc attached to said flange and capable of rotation; a revolution controlling mechanism to rotate said body of revolution freely when the apparatus is in a power-on state and to damp the rotation of said magnetic disc and keep thereof in a locked position when the apparatus is in the power-off state; a rocking arm fitted at the tip end thereof with at least one magnetic head and capable of rocking so as to allow said magnetic head to shift along said magnetic disc; an actuator for driving said rocking arm through a carriage housing with a stopper; an arm lock mechanism for turning said rocking arm, when the apparatus is in a power-off state, to shift said magnetic head along said disc on to a landing zone defined in said disc as well as to thrust said rocking arm against said stopper provided within said carriage housing, thereby locking said rocking arm and hence said magnetic head.

2. A magnetic disc recording and/or reproducing apparatus according to claim 1, wherein said revolution controlling mechanism includes an electric motor for rotating said body of revolution when the apparatus is in the power-on state and a motor brake direct-coupled to and formed integrally with said electric motor for damping the rotation of and locking said electric motor when said apparatus is in the power-off state.

3. A magnetic disc recording and/or reproducing apparatus according to claim 1, wherein said arm lock mechanism includes a means for thrusting said rocking arm to turn thereof and a locking solenoid for driving said means to rock said rocking arm thereby to shift said magnetic head onto the landing zone of said magnetic disc when the apparatus is brought into power-off state.

4. A magnetic disc recording and/or reproducing apparatus according to claim 3, wherein said locking solenoid is a rotary solenoid.

5. A magnetic disc recording and/or reproducing apparatus according to claim 3, wherein said locking solenoid is a linear solenoid.

6. A magnetic disc recording and/or reproducing apparatus according to claim 3, wherein said means for thrusting said rocking arm to turn thereof includes a projection set up on said rocking arm.

7. A magnetic disc recording and/or reproducing apparatus comprising a body of revolution including a flange and a magnetic disc attached to said flange and capable of rotation; a revolution controlling mechanism including an electric motor for rotating said body of revolution when the apparatus is in a power-on state and a motor brake direct-coupled to and formed integrally with said electric motor for damping the rotation of and locking said electric motor when said apparatus is in a power-off state; a rocking arm fitted at the tip end thereof with at least one magnetic head and capable of rocking so as to allow said magnetic head to shift along said magnetic disc; an actuator for driving said rocking arm through a carriage housing with a stopper; and an arm lock mechanism including a rotary solenoid for urging a rotor in one direction to rock said rocking arm, said rotor being rotated by a predetermined angle in the opposite direction against the urging of the rotary solenoid while the apparatus is in the power-on state and in the same direction to return to the initial angular position when the apparatus is brought into the power-off state, and a projection extending from said rocking arm, said arm lock mechanism shifting said rocking arm, when the apparatus is in the power-off state, through said projection on to a landing zone defined in said magnetic disc according to the rotation of said rotor in said one direction and thrusting said magnetic head against said stopper provided within said carriage housing, thereby locking said rocking arm and hence said magnetic head.

* * * * *